:::
(12) United States Patent  (10) Patent No.: US 8,226,185 B2
Jones et al.  (45) Date of Patent: Jul. 24, 2012

(54) DRIVE BELT SLIP AND BELT WEAR DETECTION

(75) Inventors: Michael Eugene Jones, West Linn, OR (US); David Scott Allaway, Portland, OR (US); David L. Knierim, Wilsonville, OR (US)

(73) Assignee: Xerox Corporation, Norwalk, CT (US)

( * ) Notice: Subject to any disclaimer, the term of this patent is extended or adjusted under 35 U.S.C. 154(b) by 925 days.

(21) Appl. No.: 12/208,442

(22) Filed: Sep. 11, 2008

(65) Prior Publication Data

US 2010/0060677 A1    Mar. 11, 2010

(51) Int. Cl.
*B41F 13/00* (2006.01)
*B41F 33/00* (2006.01)

(52) U.S. Cl. .......................................... 347/5

(58) Field of Classification Search ............... 347/103, 347/5, 218, 104
See application file for complete search history.

(56) References Cited

U.S. PATENT DOCUMENTS

| | | | |
|---|---|---|---|
| 5,406,359 A | 4/1995 | Fletcher | |
| 5,418,600 A | 5/1995 | Genovese | |
| 5,940,105 A * | 8/1999 | Hayami | 347/104 |
| 7,454,150 B2 * | 11/2008 | Matsuda et al. | 399/68 |
| 8,033,546 B2 * | 10/2011 | Takahashi et al. | 271/270 |
| 2001/0011507 A1 * | 8/2001 | Korem | 101/217 |
| 2006/0024088 A1 | 2/2006 | Atwood et al. | |

FOREIGN PATENT DOCUMENTS

| | | |
|---|---|---|
| EP | 0767055 | 4/1997 |
| EP | 1818572 | 8/2007 |
| JP | 01288656 | 11/1989 |
| JP | 09-123421 | * 5/1997 |
| JP | 2002311672 | 10/2002 |
| WO | 2008078980 | 7/2008 |

OTHER PUBLICATIONS

Machine-generated translation of JP 09-123421, published on May 1997.*
European Search Report, European Patent Office, Munich, DE, Dec. 29, 2009, 7 pages.

* cited by examiner

*Primary Examiner* — Huan Tran
(74) *Attorney, Agent, or Firm* — Maginot, Moore & Beck, LLP

(57) ABSTRACT

An imaging system for a printer utilizing a friction belt drum drive is comprised of a drum position sensor, drum pulley, drive belt, motor pulley, drive motor, drive motor position sensor, and controller. The velocities of the drum and motor drive pulleys are measured using the controller and position sensors. These velocities along with the drive ratio are used to determine and monitor slip between the belt and pulleys. The magnitude of the slip measured can be used to trigger the controller to respond to the slip event. These responses may include, for example, disabling the motor or reducing motor current or providing a warning indicative of an excessive slip event. Slip measurement combined with other measurements such as motor current can be used to determine the torque capacity of the friction drive. Further, long-term changes in the ratio of pulley velocities can be used to determine drive belt wear.

16 Claims, 5 Drawing Sheets

DRIVE BELT SLIP AND BELT WEAR DETECTION

FIELD

The embodiments disclosed herein relate to the field of printing and specifically to a printing device and related method for detecting the slip of a drive belt in the printing device.

BACKGROUND

Many printing devices use a rotating imaging member that receives marking material and transfers the marking material to print media. For example, solid ink printers include a rotating imaging drum. The solid ink in the printer is melted and deposited on to the drum. The drum then transfers the ink to paper.

The imaging drum in such printing devices is rotated and the paper comes into contact with the drum as it rotates. An electric motor is used to rotate the drum via a drive mechanism. The drive mechanism may include a gear drive as well as a drive belt which is operably connected between a motor pulley and a drum pulley. The drive belt is typically provided in the form of a v-belt which links the motor pulley to the drum pulley. The motor pulley is grooved to match the belt profile and the drum pulley may be grooved or flat. The v-belt relies on friction to transmit torque between the drive motor and the drum. The torque capacity of the printer is dependent in part on the belt tension and the coefficient of friction between the belt and pulleys.

In certain situations, the friction between the belt and the pulleys is insufficient to drive the imaging drum and the belt slips on one of the pulleys. Excessive belt slip between the motor and the drum may result in belt damage and objectionable noise.

A number of factors can cause variation in the torque capacity of the belt drive system. These factors include, but are not limited to (i) residual mold release agent being left on new belts; (ii) drum release agent (e.g., silicone oil) contaminating the belt or pulleys; (iii) improper belt tension as a result of various factors (e.g., improper spring installation or improper binding of the motor pivot interface); and (iv) belt wear.

Even if the belt is clean from contaminates, relatively new, and properly tensioned, a "normal" belt drive may slip when an unexpected high torque event occurs. Such unexpected high torque events include, but are not limited to (i) pressure roller attempts to climb a leading media edge under an excessive transfix load; (ii) multipick or shingled media delivered to the transfix nip causing the pressure roller to climb the leading edge of the shingled media; (iii) commanding excessive drum accelerations; (iv) a loss of servo control of the drum drive yielding unexpected high accelerations; or (v) an excessive transfix load.

In view of the foregoing, it would be desirable to provide a printing system capable of preventing belt damage or excessive noise due to belt slip. It would also be desirable to provide such a system that may also be used to identify a faulty drive system, worn belt, or events that cause excessive belt slip.

SUMMARY

A method of detecting drive belt slip in a printing device comprises driving an imaging member using a motor and a drive belt. During operation of the printing device, a first drive parameter related to the motor is determined, such as, for example, the angular velocity of the motor rotor. Also during operation of the printing device, a second drive parameter related to the imaging member is determined, such as, for example, the angular velocity of the imaging member. A slip of the drive belt is then determined based on the first drive parameter and the second drive parameter. In one embodiment, the slip is a rate of slip determined by subtracting a scaled amount of the first velocity from the second velocity. If the rate of slip exceeds a threshold amount, a slip event is declared.

In at least one embodiment, a printing device configured to detect drive belt slip comprises a motor and a first sensor configured to provide a first signal based on rotation of the motor. The first sensor may be a rotational encoder such as, for example, a hall-effect sensor configured to provide a signal indicative of the angular velocity of the motor rotor. The printing device further comprises a belt operably connected to the motor and an imaging drum operably connected to the belt such that the motor is configured to drive the drum via the belt. A second sensor is configured to provide a second signal based on rotation of the imaging drum. The second sensor may be a rotational encoder such as, for example, an optical or photo-transmissive sensor provided on the imaging drum axis of rotation and configured to provide a signal indicative of an angular velocity of the imaging drum. A controller is configured to receive the first signal and the second signal and determine the slip of the belt based on the first signal and the second signal. In at least one embodiment, the controller is configured to determine a slip velocity by subtracting a scaled amount of the angular velocity of the motor rotor from the angular velocity of the imaging drum. Furthermore, the controller is configured to determine excessive slip velocity exceeding a threshold amount and trigger a response to minimize belt slip noise and belt damage.

The above described features and advantages, as well as others, will become more readily apparent to those of ordinary skill in the art by reference to the following detailed description and accompanying drawings. While it would be desirable to provide a method and system for detecting drum drive belt slip that provides one or more of these or other advantageous features as may be apparent to those reviewing this disclosure, the teachings disclosed herein extend to those embodiments which fall within the scope of the appended claims, regardless of whether they include or accomplish one or more of the above-mentioned advantages or features.

DESCRIPTION

Figure 1:
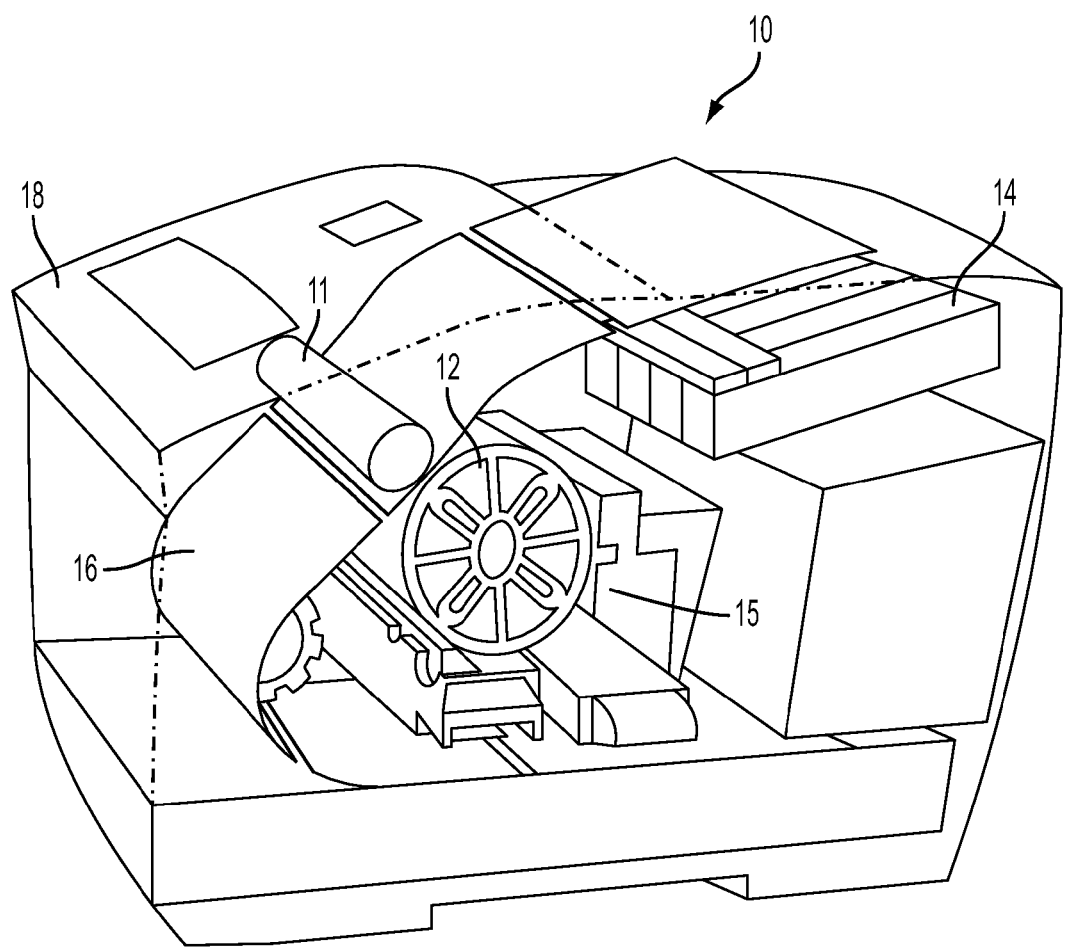
FIG. 1 shows a cutaway view of an exemplary printing device with drive slip detection.

With reference to FIG. 1, an exemplary printer with belt slip detection is shown in the form of a solid ink printer 10. The printer 10 includes a rotatable imaging drum 12. The imaging drum 12 is driven by a motor (not shown in FIG. 1). Solid ink 14 in the printer 10 is melted and a printhead 15 deposits the melted ink on the imaging drum 12. The imaging drum 12, ink 14, printhead 15 and motor are all situated within a housing 18 of the printer. When paper 16 is fed through the printer 10 and brought into contact with imaging drum 12, the ink on the drum is transferred from the imaging drum 12 to the paper 16 to create a desired image. The word "printer", "printing device" or "printing system" as used herein encompasses any apparatus, such as a digital copier, bookmaking machine, facsimile machine, multi-function machine, etc. which performs a print outputting function for any purpose. The term "marking material" as used herein encompasses any colorant or other material used to mark on paper or other media. Examples of marking material include inks, toner particles, pigments, and dyes.

Figure 2:
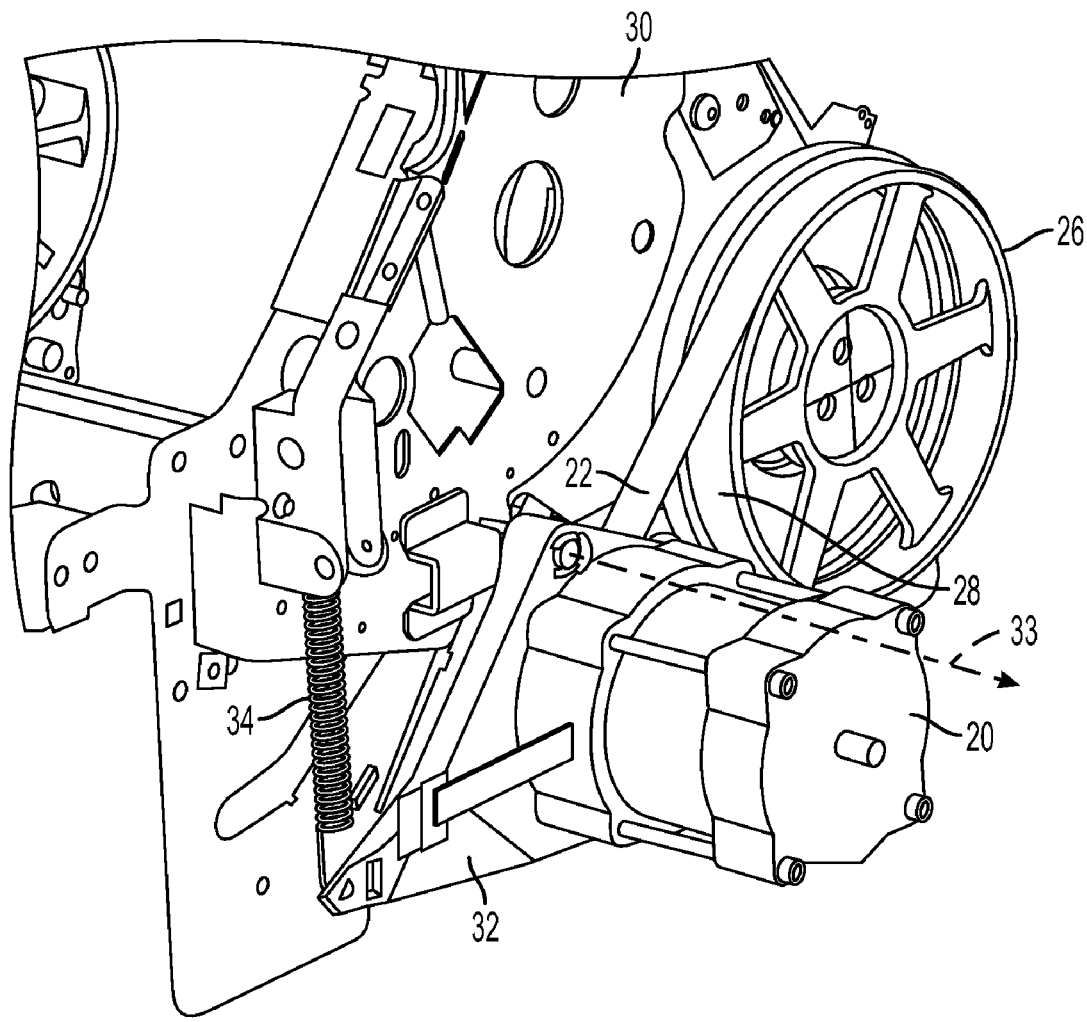
FIG. 2 shows a perspective view of a drum drive system for the printing device of FIG. 1.
Figure 3:
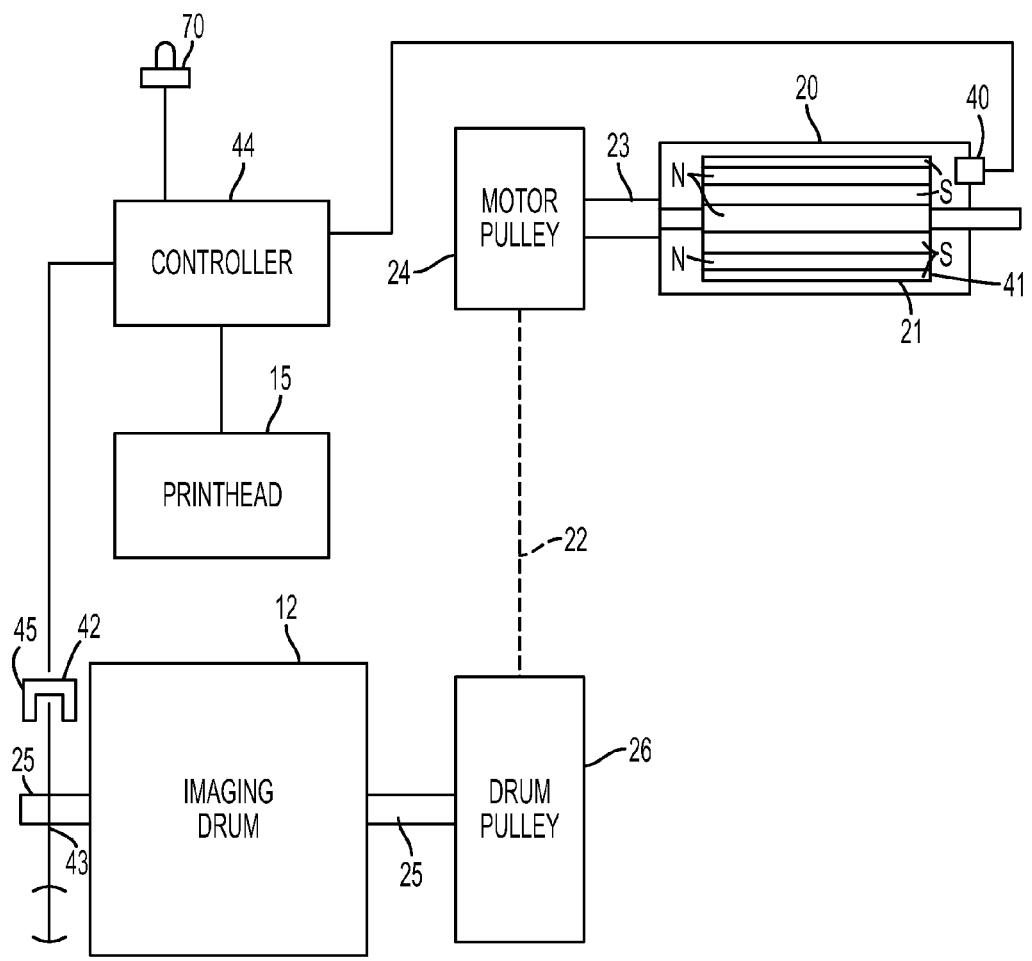
FIG. 3 shows a schematic diagram of the drive slip detection system for the printing device of FIG. 1.

With reference now to FIGS. 2-3, the imaging drum 12 is driven by an electric motor 20 and belt drive system. The drive system includes a drive belt 22 connected between a motor pulley 24 (not shown in FIG. 2) and a drum pulley 26. FIG. 2 shows a perspective view of the motor 20, belt 22 and drum pulley 26. FIG. 3 shows a schematic view of the motor 20 and drive system.

The motor pulley 24 is generally cylindrical with a cross section of external grooves that receives a similar cross section of mating ribs provided along the inner circumferential portion of the belt 22. The motor pulley 24 is connected to the motor shaft 23 and is driven by the electric motor 20. The motor 20 may be any of various electric motors appropriate for use in a printer (such as a three phase synchronous brushless motor).

The drive belt 22 is connected between the motor pulley 24 and the drum pulley 26. In at least one embodiment, the drive belt 22 is a v-belt or multi-ribbed v-belt which may be reinforced with fibers such as steel, Kevlar, or polyester. The "V" section of the belt 22 mates with the grooves on the motor pulley 24 and prevents the belt from tracking off of the motor pulley 24. Belt tension causes the "V" shaped ribs on the belt 22 to wedge into the mating grooves at the motor pulley 24. This wedging action improves the torque transmission capacity of the belt drive system.

The drum pulley 26 is also cylindrical and is mechanically linked to the motor pulley 24 via the belt 22. The v-belt is received by the drum pulley 26 along this flat outer circumferential portion 28. Belt slip may occur at either the motor pulley 24 or the drum pulley 26 to belt interface.

The imaging drum 12 is rigidly connected to the drum pulley 26 such that rotation of the drum pulley 26 directly results in rotation of the imaging drum 12. It will be recognized that the drum pulley 26 as well as the motor pulley 24 and motor 20 are also situated within the housing 18 of the printer 10 along with the imaging drum 12, as shown in FIG. 1.

As best seen in FIG. 2, the drum 12 and drum pulley 26 are mounted on a stationary mounting plate 30. The motor pulley 24 and motor 20 are mounted on a moveable mounting plate 32 which is configured to pivot about axis 33 relative to the stationary mounting plate 30. A spring 34 biases the plate 32 to pivot in a direction which encourages the motor pulley 24 and motor 20 away from the drum pulley 26. Thus, the spring 34 creates the tension on the belt 22 which mechanically links the motor pulley 24 to the drum pulley 26.

With particular reference now to FIG. 3, a first sensor 40, which in one embodiment is provided in the form of a Hall effect sensor 40, is positioned inside the motor and is configured to track the motor rotor 21 position. In at least one embodiment, the Hall effect sensor 40 is positioned across an air gap from rotor magnets 41 located inside the motor 20. A second sensor 42, which may also be in the form of a photo transmissive sensor, is positioned near the imaging drum shaft 25 and is configured to track the position of the imaging drum 12. In at least one embodiment, the second sensor includes a rotatable encoder disc 43 mounted to the imaging drum shaft 25 and a stationary receptor 45 mounted to a bracket within the printer. The position sensors 40, 42 are each connected to a controller 44. The controller 44 may comprise, for example, a microprocessor and supporting circuitry.

The first sensor 40 delivers signals to the controller 44 which are representative of the position of the motor rotor 21. Similarly, the second sensor 42 delivers signals to the controller 44 which are representative of the position of the imaging drum 12. With this information the controller 44 is able to calculate the respective angular velocities of the motor rotor 21 and the imaging drum 12. Furthermore, information about the no load drive ratio between the motor pulley 24 and the drum pulley 26 is stored in the controller 44. The controller 44 can then divide the velocity of the motor 20 by this no load drive ratio and subtract the result from the drum velocity in order to determine the amount of slip occurring. The calculated slip may then be used to trigger a fault condition or capture other measurements (e.g., motor current to determine drive torque). Furthermore, by monitoring both the velocity of the imaging drum 12 and the velocity of the motor 20 independently, a current drive ratio can be determined. As explained in further detail below, a change in the drive ratio over time can be used to provide an indication of belt wear.

During operation of the printing device, the imaging drum 12 is driven by the motor 20 and drive system. As the imaging drum 12 rotates, the controller 44 instructs the printhead 15 to deposit ink on the imaging drum 12. Paper or other media 16 is then passed between a transverse roller 11 and the surface of the imaging drum 12, causing the ink on the imaging drum 12 to be transferred to the media. If a slip event occurs during the printing process, the controller 44 is operable to identify the fault condition and trigger a fault response, such as limiting motor torque.

Figure 4:
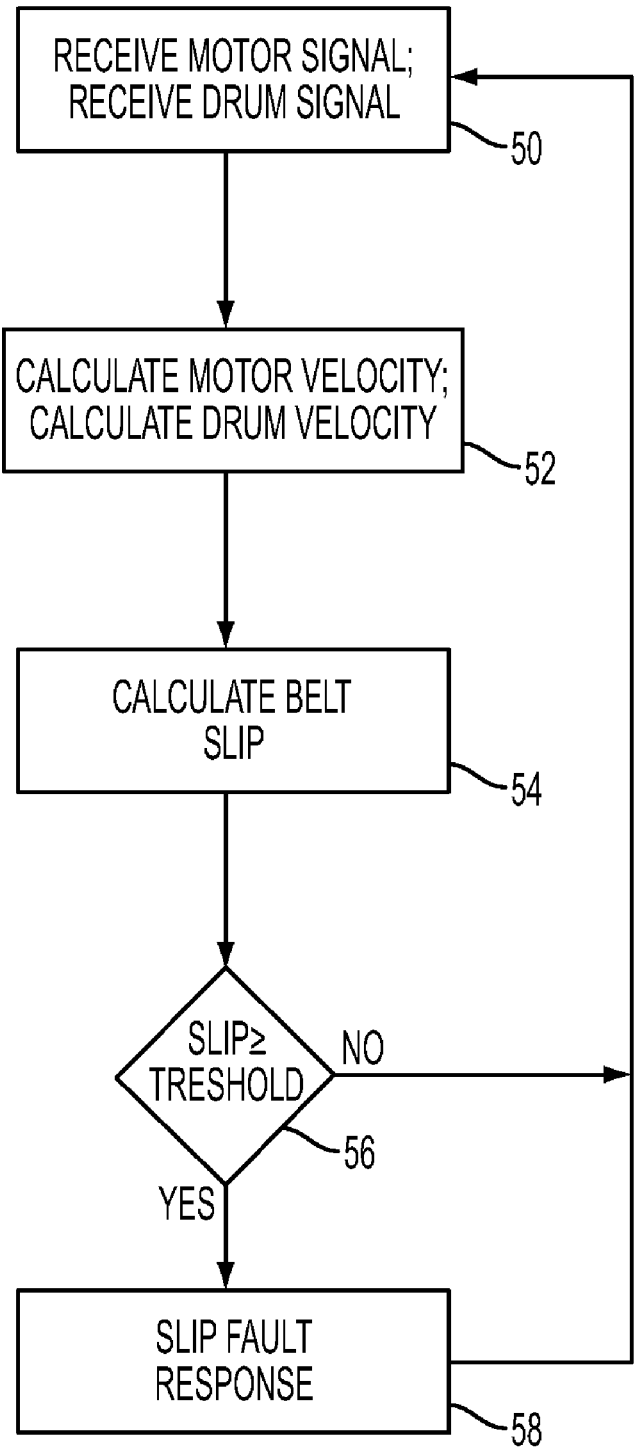
FIG. 4 shows a flow diagram of a method of calculating slip using the drive slip detection system of FIG. 3.

An exemplary method that may be used by the controller 44 to determine if a slip event is occurring is shown in FIG. 4. According to the exemplary method, at step 50, the controller 44 receives a first signal from the sensor 40 positioned near the motor 20. At the same time, the controller 44 receives a second signal from the sensor 42 positioned near the imaging drum 12. With a history of information on the motor position and drum position, a velocity signal can be generated for both the imaging drum 12 and the drive motor 20. Thus, at step 52, the controller 44 calculates an angular velocity for the motor rotor 21. At the same time, the controller 44 calculates an angular velocity for the imaging drum 12.

At step 54, the controller calculates a belt slip. The belt slip may be calculated in several ways, as will be recognized by those of skill in the art. In at least one embodiment, the belt slip is calculated by comparing the angular velocity of the motor rotor 21 to the angular velocity of the imaging drum 12. Using this method, the angular velocity of the motor rotor 21 is first scaled to the angular velocity of the imaging drum 12 by the no load drive ratio. The difference between the scaled motor rotor velocity and the imaging drum velocity is the slip velocity or rate of slip of the friction drive. In at least one exemplary embodiment, the change in motor rotor 21 and imaging drum 12 positions are sampled at approximately 20 kHz using the sensors 40, 42. The position change per unit time for each is the angular velocity. Dividing the motor rotor velocity by the no load drive ratio (e.g., approximately 10:1) scales it to an equivalent imaging drum velocity. Slip, in units of drum revolutions per second is calculated by the following equation:

slip_velocity=drum_velocity−(motor_velocity/ratio).

Alternately, differences in position can be used to calculate belt slip. Imaging drum angular position may be recorded each time the motor rotor completes some number of revolutions. (This number of motor rotor revolutions may be less than one, such as the fraction of a revolution corresponding to one electrical cycle of the motor encoder signals.) Slip distance, in units of drum position per motor revolution is calculated as:

slip_distance=drum_pos_change/motor_pos_change−1.0/ratio.

Figure 5:
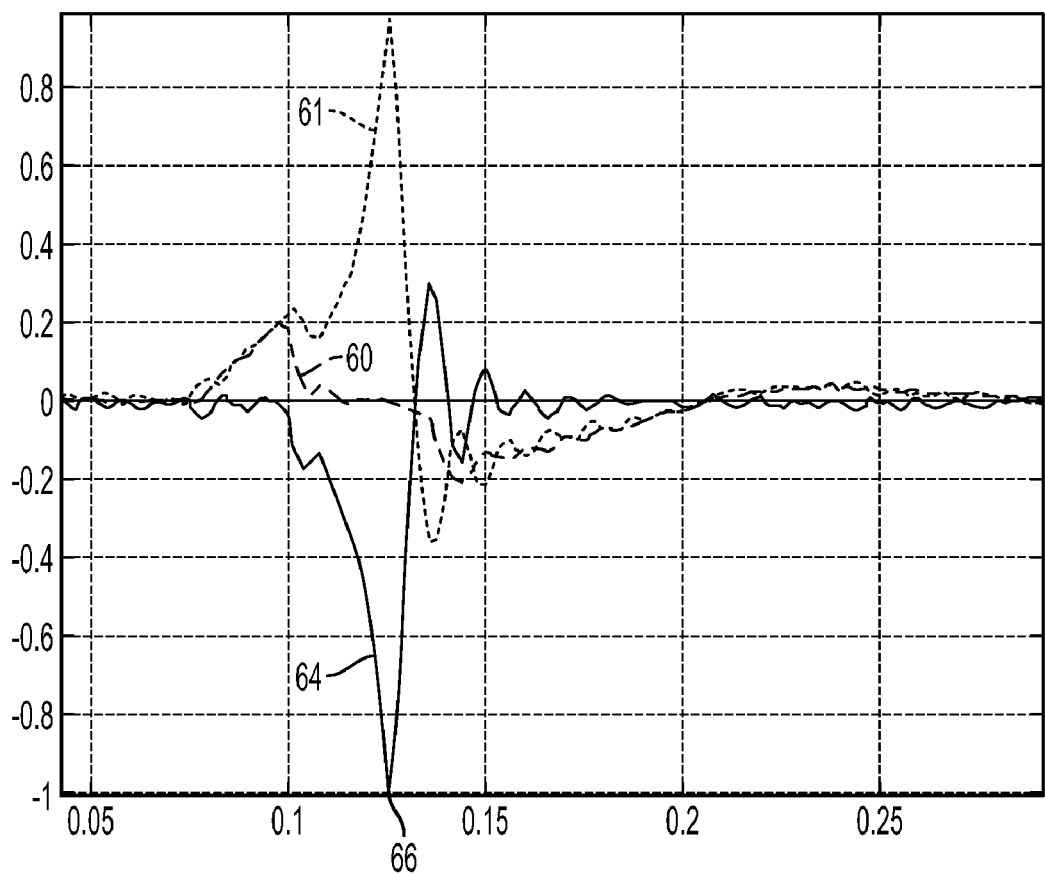
FIG. 5 shows a graph of the detected slip in an exemplary printing device using the method of FIG. 4.

The graph in FIG. 5 illustrates an exemplary slip event. The vertical scale is revolutions per second (drum velocity) and the horizontal axis is time in seconds. Trace 60 in FIG. 5 shows drum velocity. It remains near zero during the exemplary slip event shown in FIG. 5. Trace 61 in FIG. 5 shows motor velocity as it rapidly increases between 0.1 and 0.15 seconds and then decreases. Trace 64 in FIG. 5 shows the calculated slip.

In the example of FIG. 5, the drum drive system was allowed to operate until slip increased to a slip threshold of approximately one imaging drum revolution-per-second (absolute value) as indicated at point 66 on trace 64. It was previously determined that slip events in excess of one drum revolution-per-second are characteristically very noisy and may damage the belt 22. Limiting the slip in the example of FIG. 5 to a threshold of 1 drum revolution per second (absolute value) prevented offensive noise and minimized belt damage.

In the example of FIG. 5, when the slip reached the threshold set at 1 (i.e., point 66 on trace 64), a slip fault condition was declared. As a result, the controller 44 immediately took steps to limit the torque output of the motor 20. In this case, the motor 20 was disabled. In other embodiments, other responses to limit slip are possible. For example, rather than a response that completely disables the motor 20, the motor command current can be reduced. This in effect limits the drive torque of the motor 20.

By measuring belt slip and motor current together, the torque capacity of the belt drive can be determined. A slip event may be created by accelerating the imaging drum 12, thus using imaging drum inertia to create resistive torque to the motor 20. The torque at the motor pulley 24 required to create a given slip is calculated using motor current values that correspond to the slip measured. Total motor torque is the motor current multiplied by the motor torque constant. Motor pulley 24 torque is the total motor torque minus the torque required to accelerate the motor rotor 21. Belt drive torque capacity is equal to the motor pulley 24 torque capacity multiplied by the drive ratio. Accordingly, by detecting belt slip, the belt 22 can be protected from damage caused by excessive slip. In addition, belt slip can be used to identify faulty belt drive assemblies by measuring belt slip and motor current to quantify drive torque capacity.

In addition to providing a system for detecting belt slip, the drive system for the printer described herein may also be used to provide a system for detecting belt wear. In particular, by monitoring both the imaging drum and motor velocities independently, an existing drive ratio for the printer can be determined. By monitoring changes in the drive ratio over time, an indication of belt wear is provided. A worn belt rides lower in the grooves of the pulleys, reducing the effective diameter of the pulleys. A given change in effective pulley diameter has much more relative affect on the smaller motor pulley, so the drive ratio increases. Accordingly, an increase in the drive ratio of motor rotor revolutions to imaging drum revolutions occurs over time. When the mass of the belt is plotted against the drive ratio over time, a relatively linear relationship will be seen between belt mass and drive ratio. In at least one embodiment of the printer described herein, a new belt with a mass of about 21 grams provides a drive ratio of approximately 9.9:1, while a belt worn to near failure with a mass of 11 grams provides a drive ratio of approximately 10.9:1. A relatively linear relationship between belt mass and drive ratio can be seen in between these two points.

In view of the foregoing, the printer disclosed herein may be used to monitor belt wear. For example, with reference again to FIG. 3, the controller 44 may be used to monitor the imaging drum 12 velocity and the motor rotor 21 velocity, and calculate the drive ratio for the drive system. The controller 44 may then determine the wear condition of the belt 22 based on the calculated drive ratio. In particular, if the drive ratio reaches a threshold, the printer may be equipped with an alarm or other warning (e.g., warning light 70 shown in FIG. 3, or a text display on a screen) indicating that the belt 22 should be replaced.

It will be recognized that the techniques disclosed herein for determining belt slip and wear may have applications beyond printer technologies. For example, in the automotive industry belt drives are used to transmit power to many peripherals such as the alternator, power steering pump, water pump, air conditioner pump, etc. In one embodiment, a car's on board diagnostics may be utilized to automatically determine excessive belt slip or wear for use in service diagnostics and or to initiate a service required indicator. Many modern engines use an Engine Control Module (ECM) that receives signals from a crank shaft position sensor. Thus, the engine position and velocity information is already available. By adding a sense signal to one or more peripheral devices, here to the belt slip, ratio and wear could be monitored. In one embodiment, the sense signal may be simply and easily implemented within the alternator. A tachometer signal, generated by the alternators internal changing magnetic field, may be routed to the ECU via a single wire using chassis ground as reference.

Although the various embodiments have been provided herein, it will be appreciated by those of skill in the art that other implementations and adaptations are possible. Furthermore, aspects of the various embodiments described herein may be combined or substituted with aspects from other features to arrive at different embodiments from those described herein. Thus, it will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method of operating a printing device comprising:
   a) driving an imaging member using a motor and a drive belt;
   b) depositing marking material on the imaging member using a printhead;
   c) determining a first velocity of the motor;
   d) determining a second drive velocity of the imaging member; and
   e) determining a rate of slip of the drive belt with reference to a slip velocity, which is obtained by subtracting a scaled first velocity from the second velocity.

2. The method of claim 1 wherein the step of driving the imaging member comprises:

driving an imaging drum, wherein the drive belt is operably connected between the imaging drum and the motor.

3. The method of claim 1 wherein the step of determining the second velocity comprises:
determining an angular velocity of the imaging member.

4. The method of claim 3 wherein the step of determining the angular velocity of the imaging member comprises:
receiving a signal indicative of the angular velocity of the imaging member from a rotational encoder.

5. The method of claim 1 wherein the scaled first velocity is obtained by dividing the first velocity by a no load drive ratio of the first velocity to the second velocity.

6. The method of claim 1 further comprising the step of limiting motor torque when the slip exceeds a threshold amount.

7. The method of claim 6 wherein the step of limiting motor torque comprises:
disabling the motor or limiting the motor current.

8. The method of claim 1 further comprising the step of:
providing an indication of the condition of the drive belt based on the determined rate of slip.

9. The method of claim 1 further comprising the step of:
providing an indication of belt wear based on a no load drive ratio determined by the first velocity and the second velocity.

10. A printing device comprising:
a motor including a rotor;
a first sensor configured to provide a first signal based on rotation of the rotor;
a belt operably connected to the motor;
an imaging member operably connected to the belt;
a printhead configured to deposit marking material on the imaging member;
a second sensor configured to provide a second signal based on rotation of the imaging member; and
a controller configured to:
receive the first signal and the second signal;
determine a scaled velocity with reference to the first signal and a no load drive ratio;
determine an angular velocity of the imaging member with reference to the second signal; and
determine a rate of slip of the belt with reference to a slip velocity obtained by subtracting the scaled velocity of the rotor from the angular velocity of the imaging member.

11. The printing device of claim 10 wherein the first sensor is a hall-effect sensor or a photo-sensor and the first signal is a signal indicative of an angular velocity of the rotor, and wherein the second sensor is a hall-effect sensor or a photo sensor and the second signal is a signal indicative of an angular velocity of the imaging member.

12. The printing device of claim 10 wherein the imaging member is an imaging drum.

13. The printing device of claim 10 wherein the controller is further configured to limit the motor torque when the slip rate exceeds a threshold amount.

14. A printing device comprising:
a motor including a rotor;
a first sensor configured to provide a first signal based on rotation of the rotor;
a belt operably connected to the motor;
an imaging member operably connected to the belt;
a printhead configured to deposit marking material on the imaging member;
a second sensor configured to provide a second signal based on rotation of the imaging member; and
a controller configured to receive the first signal and the second signal and determine a drive ratio based on the first signal, the second signal, and a no load drive ratio.

15. The printing device of claim 14 wherein the controller is further configured to determine whether the drive ratio passes a threshold drive ratio.

16. The printing device of claim 15 wherein the controller is further configured to deliver a signal indicative of excessive belt slip or belt wear if the drive ratio passes the threshold drive ratio.

* * * * *